(12) United States Patent
Murayama (10) Patent No.: US 11,846,994 B2
(45) Date of Patent: Dec. 19, 2023

(54) ELECTRONIC DEVICE

(71) Applicant: Dynabook Inc., Tokyo (JP)

(72) Inventor: Tomomi Murayama, Tokyo (JP)

(73) Assignee: Dynabook Inc., Tokyo (JP)

( * ) Notice: Subject to any disclaimer, the term of this patent is extended or adjusted under 35 U.S.C. 154(b) by 93 days.

(21) Appl. No.: 17/645,431

(22) Filed: Dec. 21, 2021

(65) Prior Publication Data

US 2022/0113768 A1 Apr. 14, 2022

Related U.S. Application Data

(63) Continuation of application No. PCT/JP2019/026196, filed on Jul. 1, 2019.

(51) Int. Cl.
*G06F 1/16* (2006.01)
*G06F 1/20* (2006.01)

(52) U.S. Cl.
CPC ............ *G06F 1/1656* (2013.01); *G06F 1/203* (2013.01)

(58) Field of Classification Search
CPC .......... G06F 1/1656; G06F 1/203; G06F 1/16; G06F 1/1607; G06F 1/1633; F16M 13/00; F16M 11/10; F16M 2200/08; F16M 13/02; F16M 11/04; F16M 11/2021; H04M 1/04; H04M 1/02; H05K 5/0204; H05K 5/0217; H05K 7/14; H05K 5/0234
See application file for complete search history.

(56) References Cited

U.S. PATENT DOCUMENTS

| | | | |
|---|---|---|---|
| 11,245,174 B2 * | 2/2022 | Hirota | ...................... H01Q 1/48 |
| 2003/0179543 A1 * | 9/2003 | Sri-Jayantha | ......... G06F 1/1656 |
| | | | 312/223.2 |
| 2008/0253081 A1 * | 10/2008 | Tracy | ...................... G06F 1/203 |
| | | | 361/679.5 |

(Continued)

FOREIGN PATENT DOCUMENTS

| | | |
|---|---|---|
| JP | S61-123995 U | 8/1986 |
| JP | H10-270864 A | 10/1998 |

(Continued)

OTHER PUBLICATIONS

Dell, New XPS 13 (9380); https://www.dell.com/jajp/work/shop/デルのノートパソコン /new-xps-13/spd/xps-13-9380-laptop; in 4 pages (2019).

(Continued)

*Primary Examiner* — Michael A Matey
(74) *Attorney, Agent, or Firm* — Knobbe, Martens, Olson & Bear, LLP (57) ABSTRACT

According to one embodiment, an electronic device includes a housing unit including a surface at least on a side on which the housing unit is placed, the housing unit including an attachment portion, the attachment portion including a groove and a protrusion, and a support unit that supports the housing unit. The support unit is provided continuously from one end side to the other end side of the surface. Rigidity of an intermediate portion located between the one end side and the other end side is made lower than rigidity of both end portions on the one end side and the other end side by making a protrusion length of the protrusion at the intermediate portion shorter than a protrusion length of the protrusion at both the end portions.

13 Claims, 9 Drawing Sheets

(56) References Cited

U.S. PATENT DOCUMENTS

| | | | |
|---|---|---|---|
| 2011/0122562 A1* | 5/2011 | Lev | G06F 1/1616 |
| | | | 361/679.55 |
| 2011/0279974 A1 | 11/2011 | Fujiwara | |
| 2018/0210507 A1* | 7/2018 | Morrison | G06F 1/203 |

FOREIGN PATENT DOCUMENTS

| | | | |
|---|---|---|---|
| JP | 2003-167644 A | 6/2003 |
| JP | 4048349 B2 | 2/2008 |
| JP | 2011-238063 A | 11/2011 |
| JP | 2016-071785 A | 5/2016 |
| JP | 2018-073877 A | 5/2018 |

OTHER PUBLICATIONS

International Search Report and Written Opinion issued for International Patent Application No. PCT/JP2019/026196, dated Aug. 13, 2019 in 9 pages including English translation.

\* cited by examiner

ELECTRONIC DEVICE

CROSS-REFERENCE TO RELATED APPLICATIONS

This application is a Continuation Application of PCT Application No. PCT/JP2019/026196, filed Jul. 1, 2019, the entire contents of which are incorporated herein by reference.

FIELD

Embodiments described herein relate generally to an electronic device.

BACKGROUND

In an electronic device, a support unit is attached to a housing unit. The housing unit is supported using the support unit.

DETAILED DESCRIPTION

Hereinafter, embodiments will be described with reference to the drawings. Note that the disclosure is merely an example, and the invention is not limited by the contents described in the following embodiments. Modifications that can be easily conceived by those skilled in the art are naturally included in the scope of the disclosure. In order to make the description clearer, in the drawings, the size, shape, or the like of each portion may be changed and schematically represented with respect to the actual embodiments. In a plurality of drawings, corresponding elements may be denoted by the same reference numerals, and a detailed description may be omitted. In the drawings, the lateral width direction X, the depth direction Y, and the height direction Z of a base housing unit 150 and the like are indicated by arrows.

In general, according to one embodiment, an electronic device comprises a housing unit including a surface at least on a side on which the housing unit is placed, the housing unit including an attachment portion, the attachment portion including a groove and a protrusion which are provided on the surface; and a support unit that supports the housing unit, the support unit including an upper surface and a groove, the upper surface being provided on the groove of the housing unit, the groove of the support unit being formed in the upper surface, and the protrusion being able to be inserted into the groove of the support unit. The support unit is provided continuously from one end side to the other end side of the surface, the groove formed in the support unit is provided continuously along a longitudinal direction with a constant depth, and the protrusion of the housing unit is formed in a rectangular form along the longitudinal direction. Rigidity of an intermediate portion located between the one end side and the other end side is made lower than rigidity of both end portions on the one end side and the other end side by making a protrusion length of the protrusion at the intermediate portion shorter than a protrusion length of the protrusion at both the end portions.

A configuration of a laptop computer 100 of a first embodiment will be described with reference to FIGS. 1 to 13.

Figure 1:
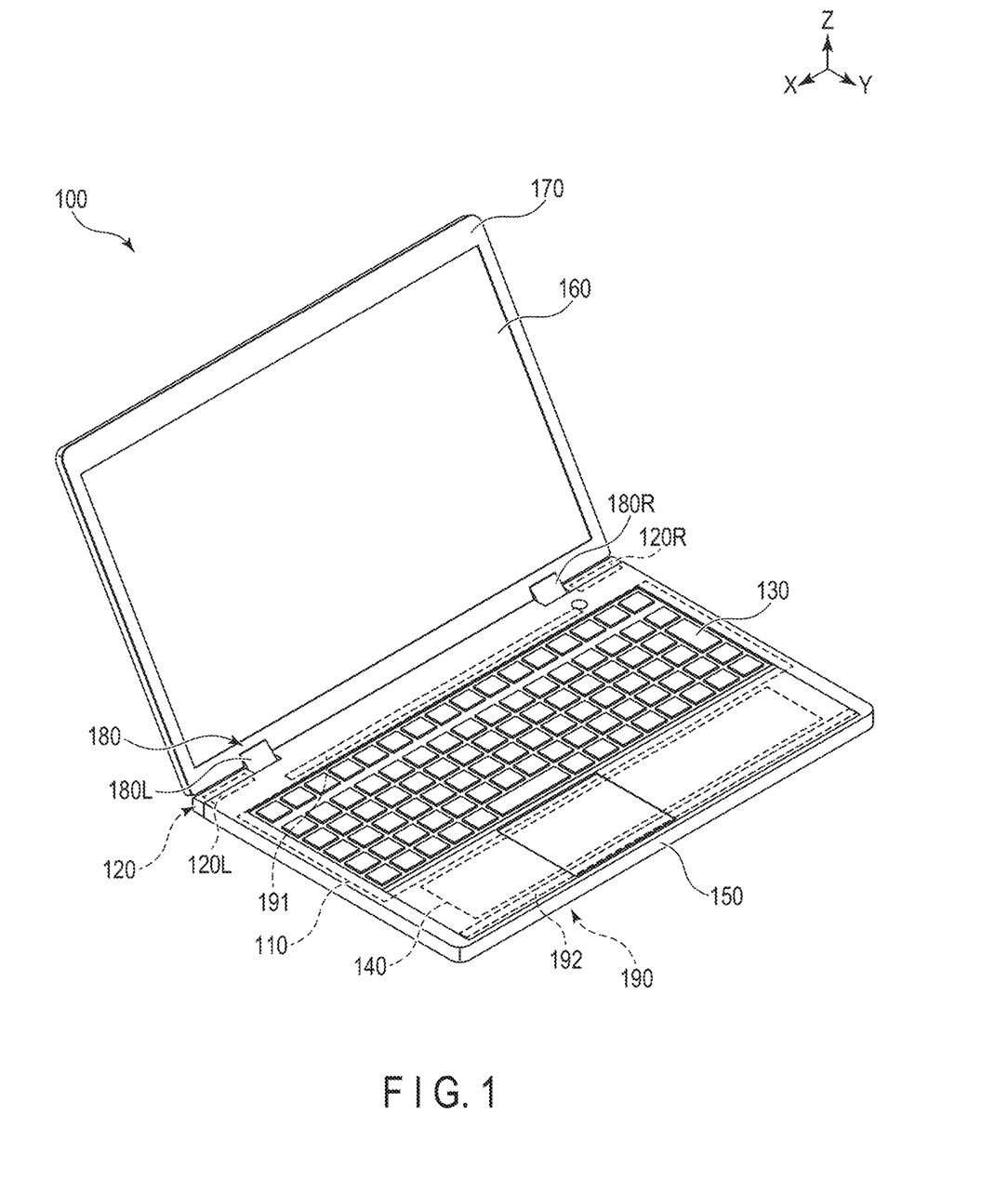
FIG. 1 is a perspective view illustrating a laptop computer 100 of a first embodiment in an opened state from an upper front side.
Figure 2:
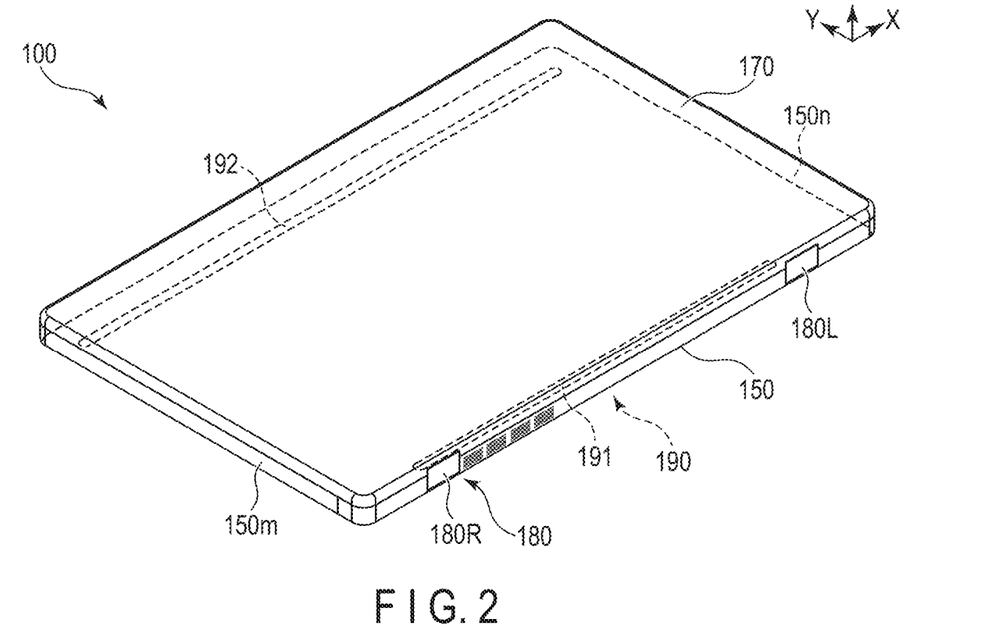
FIG. 2 is a perspective view illustrating the laptop computer 100 of FIG. 1 in a closed state from an upper rear side.
Figure 3:
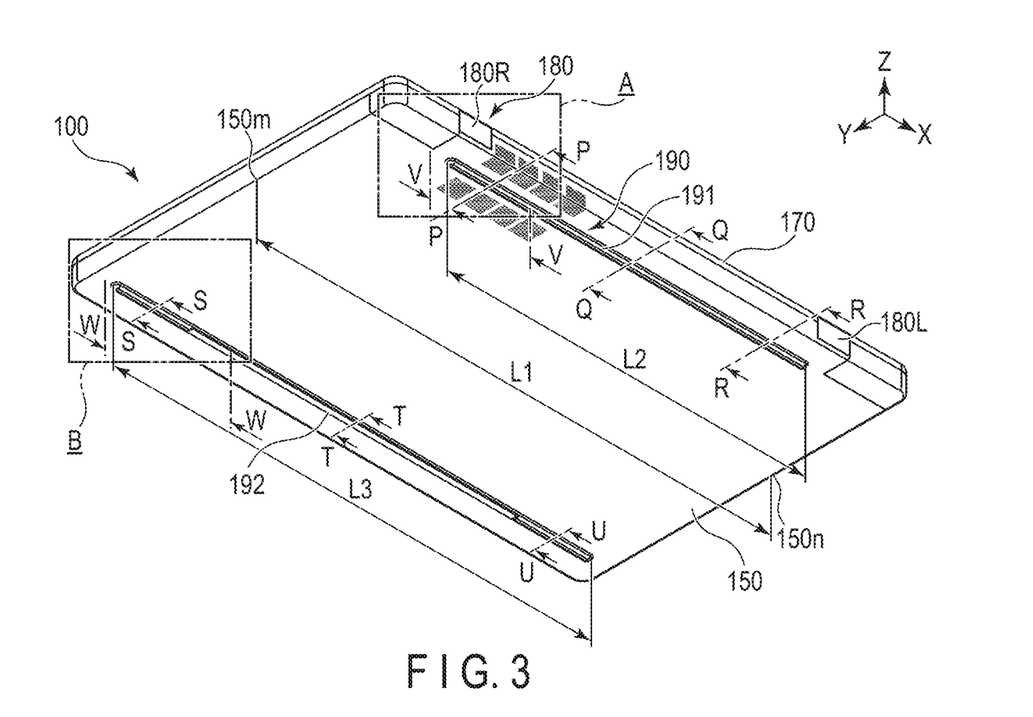
FIG. 3 is a perspective view illustrating the laptop computer 100 of FIG. 2 from a lower side.
Figure 4:
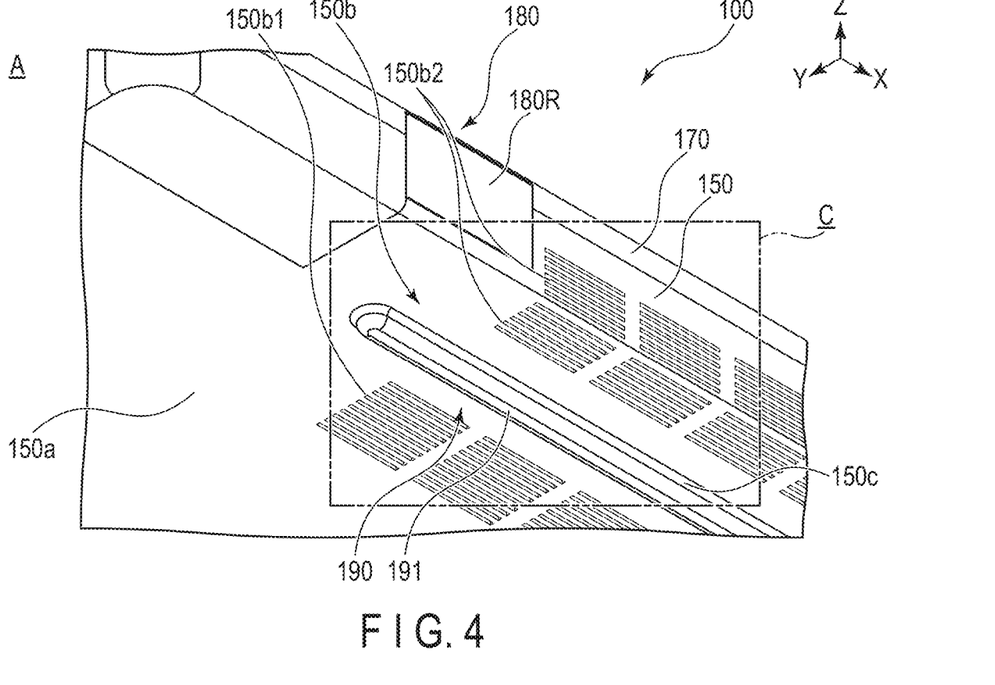
FIG. 4 is an enlarged perspective view illustrating a region "A" in FIG. 3.

FIG. 1 is a perspective view illustrating the laptop computer 100 of the first embodiment in an opened state from an upper front side. FIG. 2 is a perspective view illustrating the laptop computer 100 of FIG. 1 in a closed state from an upper rear side. FIG. 3 is a perspective view illustrating the laptop computer 100 of FIG. 2 from a lower side. FIGS. 4 to 13 are views illustrating various portions of FIG. 3.

The laptop computer 100 (referred to as an electronic device in the claims) includes an arithmetic operation unit 110, a communication unit 120, an input/output unit 130, a power supply unit 140, a base housing unit 150 (referred to as a housing unit in the claims), a display unit 160, a display housing unit 170 (referred to as another housing unit in the claims), a coupling unit 180, and a support unit 190. In the laptop computer 100, the base housing unit 150 holds the arithmetic operation unit 110, the communication unit 120, the input/output unit 130, and the power supply unit 140. The display housing unit 170 holds the display unit 160. The base housing unit 150 and the display housing unit 170 are openably/closably coupled by the coupling unit 180. The support unit 190 is attached to a lower surface 150a (referred to as a surface in the claims) of the base housing unit 150. Each unit included in the laptop computer 100 will be described in order.

As illustrated in FIG. 1, the arithmetic operation unit 110 is a unit that performs arithmetic operation in the laptop computer 100. The arithmetic operation unit 110 includes a motherboard which is a system board. The motherboard includes a substrate on which a read only memory (ROM), a central processing unit (CPU), a random access memory (RAM), and the like are mounted.

As illustrated in FIG. 1, the communication unit 120 (a first communication unit 120R and a second communication unit 120L) is a unit that performs wireless communication or the like with an external device via the arithmetic operation unit 110. The communication unit 120 includes an interface (I/F) with the motherboard of the arithmetic operation unit 110 and an antenna.

As illustrated in FIG. 1, the input/output unit 130 is a unit in which an input/output operation of data is performed by a user. The input/output unit 130 includes a power button, a keyboard, a touch pad, a speaker, a microphone, and an input/output terminal (for example, a USB terminal).

As illustrated in FIG. 1, the power supply unit 140 is a unit that supplies power to the arithmetic operation unit 110, the communication unit 120, the input/output unit 130, and the display unit 160. The power supply unit 140 includes, for example, a lithium ion secondary battery. The power supply unit 140 is charged from an external power supply via an AC adapter.

As illustrated in FIGS. 1 to 13, the base housing unit 150 is a unit that holds the arithmetic operation unit 110, the communication unit 120, the input/output unit 130, the power supply unit 140, and the like. As illustrated in FIG. 1, the base housing unit 150 accommodates the arithmetic operation unit 110, the communication unit 120, and the power supply unit 140. The input/output unit 130 is attached to the upper surface of the base housing unit 150. The support unit 190 is attached to the lower surface 150a of the base housing unit 150. The lower surface 150a has a rectangular shape, for example, a rectangular shape in which the lateral width direction X is longer than the depth direction Y. A configuration related to attachment of the support unit 190 to the base housing unit 150 will be described together with a configuration of the support unit 190 described later.

The lower surface 150a of the base housing unit 150 is provided with a ventilation portion 150b. The ventilation portion 150b is provided on the rear side (at the time of using the laptop computer 100, the far side with respect to the user) adjacent to the coupling unit 180 on the lower surface 150a. The ventilation portion 150b includes a plurality of intake ports 150b1 and a plurality of exhaust ports 150b2. The intake ports 150b1 are openings for taking in cooling air to the base housing unit 150. The exhaust ports 150b2 are openings for releasing heat generated inside the base housing unit 150 to the outside. The exhaust ports 152b2 may be provided in only one of the rear surface and the lower surface 150a, or in both of the rear surface and the lower surface 150a as illustrated in the drawings.

As illustrated in FIG. 1, the display unit 160 is a unit that displays an image, information, and the like via the arithmetic operation unit 110. The display unit 160 includes, for example, a liquid crystal display (LCD). The display unit 160 may be configured using an organic electroluminescence display instead of the liquid crystal display.

As illustrated in FIGS. 1 to 5, the display housing unit 170 is a unit that holds the display unit 160. The display housing unit 170 includes a housing that holds the liquid crystal display or the like. The housing is elastically deformed when subjected to stress.

As illustrated in FIGS. 1 to 5, the coupling unit 180 (a first coupling unit 180R and a second coupling unit 180L) is a unit that rotatably couples the base housing unit 150 and the display housing unit 170. The coupling unit 180 includes a hinge. The laptop computer 100 is opened and closed by rotating (separating and approaching) the display housing unit 170 with respect to the base housing unit 150 with the coupling unit 180 as an axis.

As illustrated in FIGS. 1 to 13, the support unit 190 is a unit that supports the base housing unit 150 from the lower surface 150a side. The support unit 190 includes a first support member 191 (first leg) and a second support member 192 (second leg). The first support member 191 and the second support member 192 are attached to the base housing unit 150.

Figure 5:
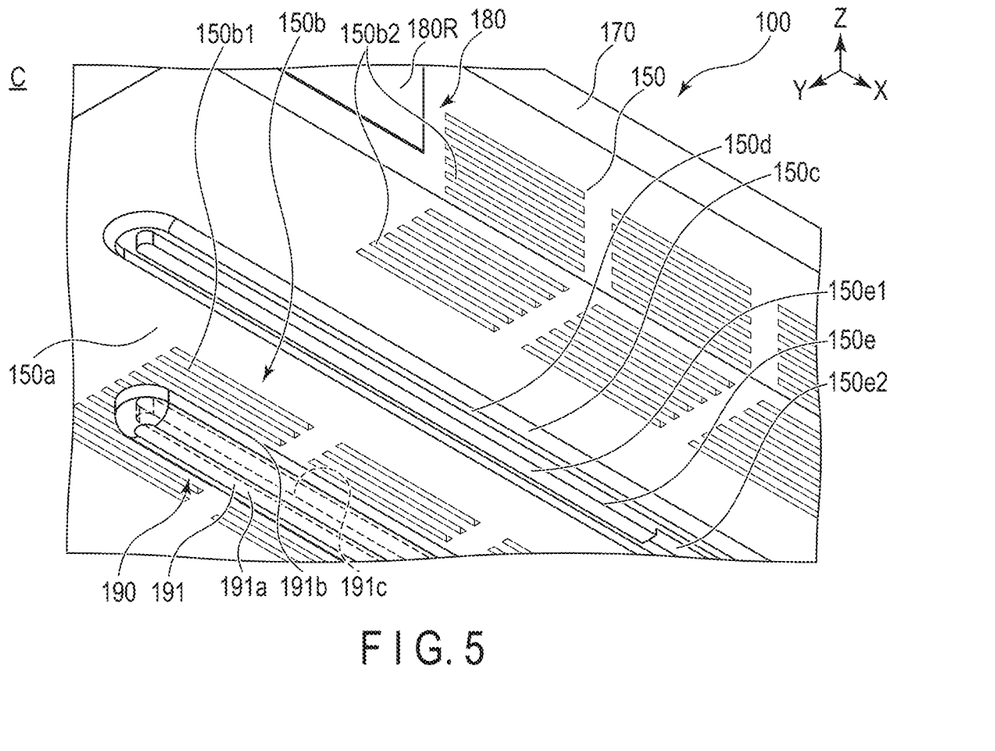
FIG. 5 is an enlarged perspective view of a region "C" in FIG. 4, illustrating a first support member 191 of a support unit 190 removed from a base housing unit 150.
Figure 6:
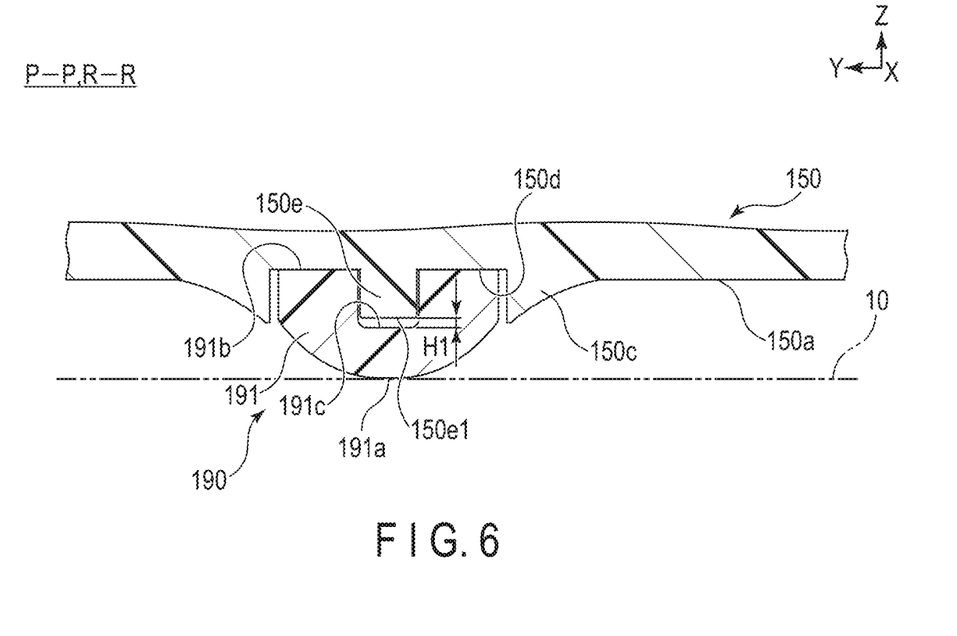
FIG. 6 is an end view illustrating FIG. 3 along the line P-P and line R-R.

As illustrated in FIGS. 1 to 8, the first support member 191 is provided along the lateral width direction X of the base housing unit 150 on the rear side (at the time of using the laptop computer 100, the far side with respect to the user) adjacent to the coupling unit 180. The first support member 191 is formed to be long, and is provided such that the longitudinal direction (lateral width direction X) is along a line connecting one end 150m side to the other end 150n side of the lower surface 150a. A total length L2 of the first support member 191 in the lateral width direction X is 50% or more of a total length L1 from the one end 150m to the other end 150n of the lower surface 150a. The first support member 191 is provided between the intake ports 150b1 and the exhaust ports 150b2. As illustrated in FIGS. 5 and 6, the first support member 191 includes a lower portion 191a in contact with a placement surface 10 of a desk, an upper portion 191b attached to the base housing unit 150, and a recess 191c having a concave portion formed in the upper portion 191b.

Figure 7:
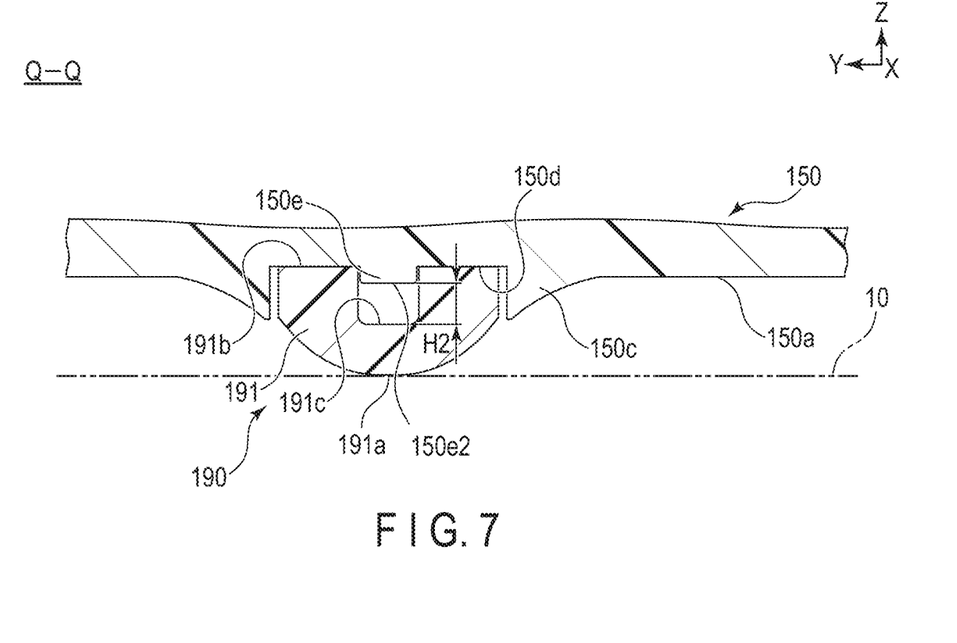
FIG. 7 is an end view illustrating FIG. 3 along the line Q-Q.
Figure 8:
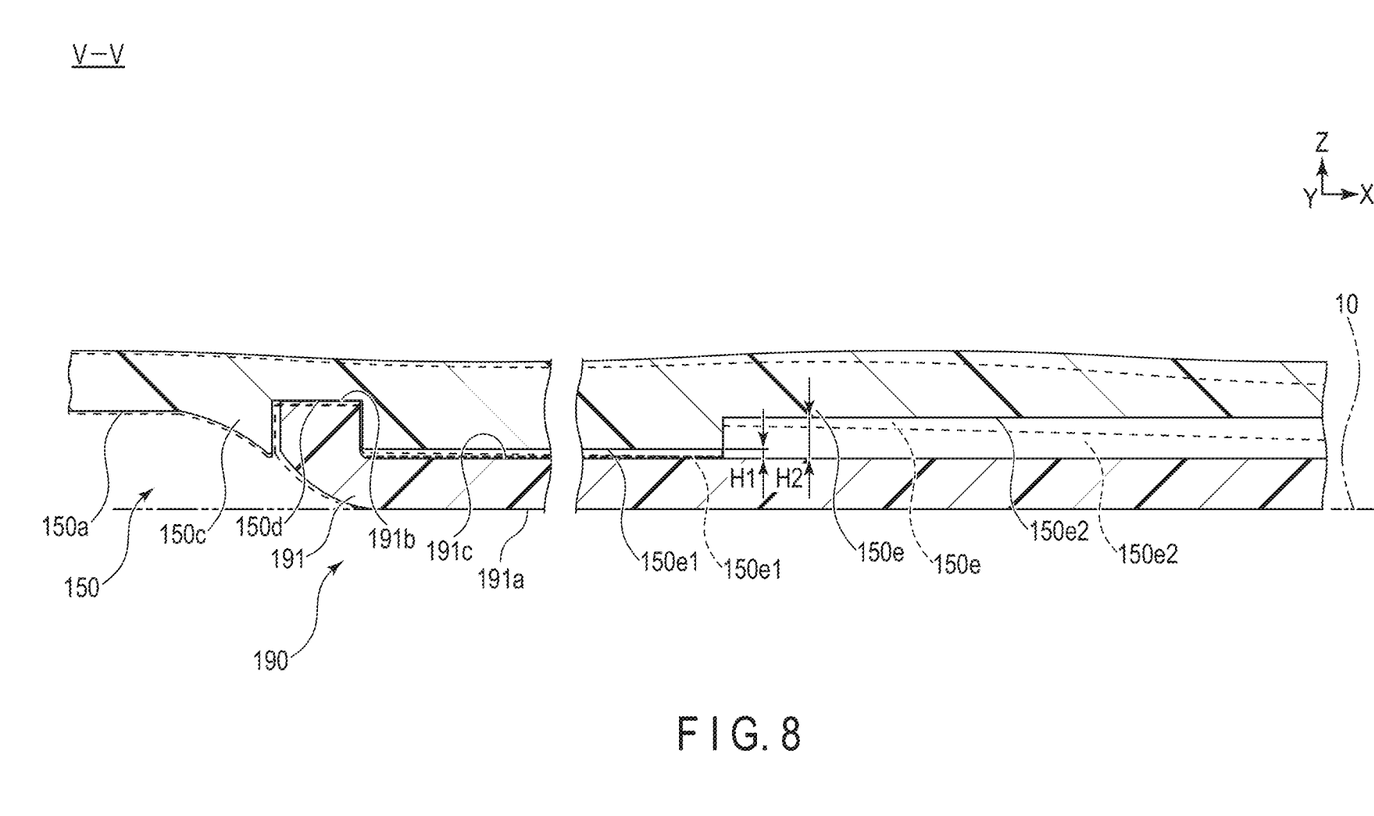
FIG. 8 is an end view illustrating FIG. 3 along the line V-V.
Figure 9:
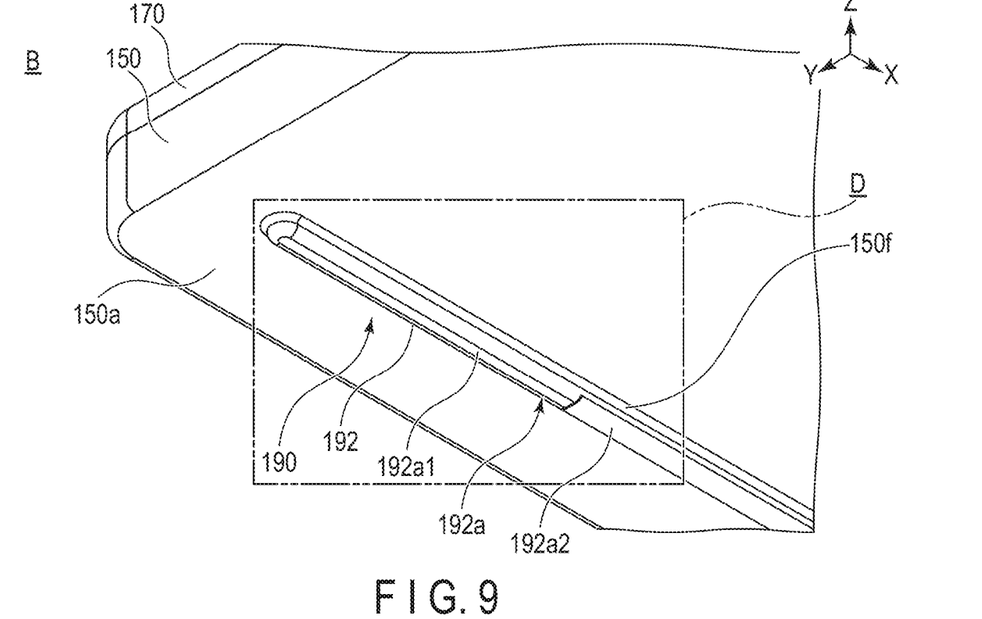
FIG. 9 is an enlarged perspective view illustrating a region "B" in FIG. 3.

In the first support member 191 and the base housing unit 150, as illustrated in FIGS. 6 to 8, a gap H2 (FIG. 7) constituting a clearance in the intermediate portion is larger than a gap H1 (FIG. 6) constituting a clearance in each of both end portions. The first support member 191 is made of elastic rubber or resin, for example. The first support member 191 is softer and elastically deformed more easily than the base housing unit 150. That is, the first support member 191 has stability when the base housing unit 150 is placed, and has a structure that is easily deformed along the deformation of the base housing unit 150. Further, in the lower surface 150a having a rectangular shape in which the lateral width direction X is longer than the depth direction Y, it is preferable that both the first support member 191 and the second support member 192 be provided on the lower surface 150a whose longitudinal direction is oriented along the lateral width direction X having a longer dimension.

The lower portion 191a is formed in, for example, an arc shape. As illustrated in FIGS. 5 and 6, the lower portion 191a is curved so as to bulge downward when viewed along the lateral width direction X of the base housing unit 150 (orthogonal to the depth direction Y and the height direction Z).

The upper portion 191b is formed in, for example, a thin planar shape. As illustrated in FIGS. 5 and 6, the upper portion 191b is formed of a plane along the lateral width direction X and the depth direction Y of the base housing unit 150.

Here, as illustrated in FIGS. 5 and 6, the upper portion 191b is attached to a lower surface 150d of a groove of a first attachment portion 150c of the base housing unit 150. The first attachment portion 150c is formed in an elongated frame shape and protrudes downward from the lower surface 150d.

The recess 191c is a hole opened in the upper portion 191b. As illustrated in FIG. 6, the recess 191c is formed in a rectangular shape when viewed along the lateral width direction X of the base housing unit 150 (orthogonal to the depth direction Y and the height direction Z). As illustrated in FIGS. 6 and 7, the recess 191c has a constant depth along the lateral width direction X of the base housing unit 150.

Here, as illustrated in FIGS. 6 and 7, a protrusion 150e formed on the lower surface 150d of the base housing unit 150 is inserted into the recess 191c. The protrusion 150e is formed in a long rectangular shape along the lateral width direction X and protrudes downward from the lower surface 150d. As illustrated in FIGS. 5 to 8, in the protrusion 150e, a protrusion length of a second protrusion 150e2 (FIG. 7) corresponding to an intermediate portion of the base housing unit 150 indicated by the line Q-Q (FIG. 3) is shorter than a protrusion length of a first protrusion 150e1 (FIG. 6) corresponding to each of both the end portions of the base housing unit 150 indicated by the line P-P and line R-R (FIG. 3). Therefore, the gap H2 between the second protrusion 150e2 and the recess 191c in the intermediate portion illustrated in FIG. 7 is wider along the height direction Z than the gap H1 between the first protrusion 150e1 and the recess 191c in each of both the end portions illustrated in FIG. 6.

Figure 10:
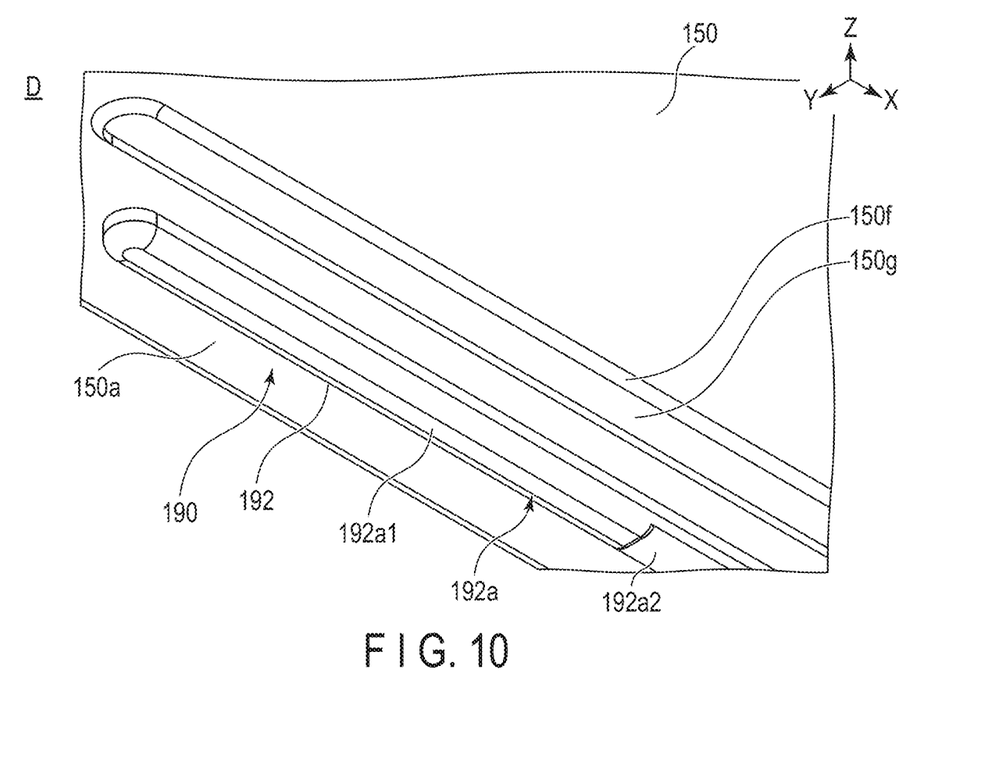
FIG. 10 is an enlarged perspective view of a region "D" in FIG. 9, illustrating a second support member 192 of the support unit 190 removed from the base housing unit 150.
Figure 11:
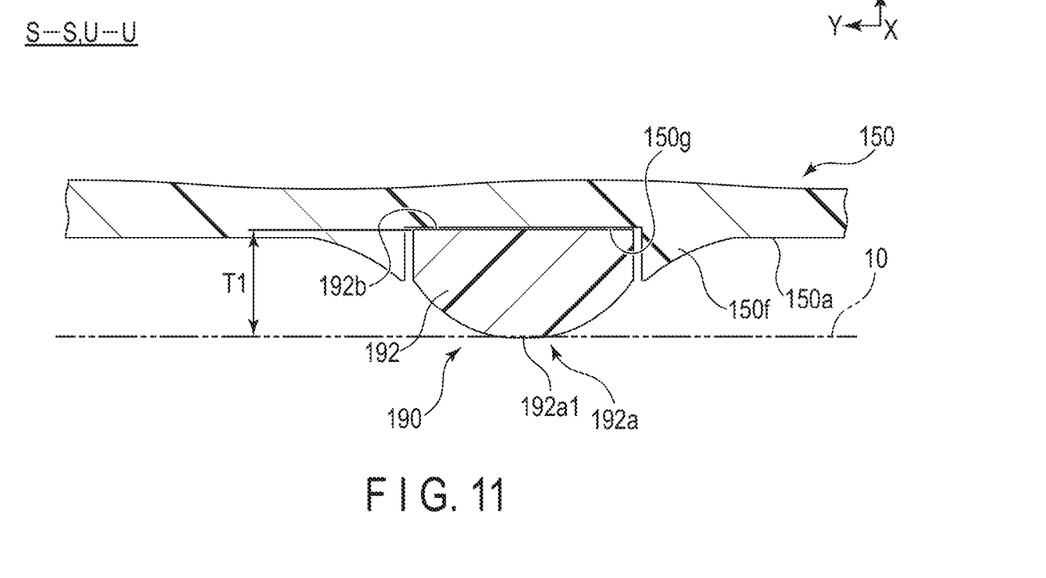
FIG. 11 is an end view illustrating FIG. 3 along the line S-S and line U-U.

As illustrated in FIGS. 1 to 3 and FIGS. 9 to 13, the second support member 192 is provided along the lateral width direction X of the base housing unit 150 on the front side (at the time of using the laptop computer 100, the near side with respect to the user) where the power supply unit 140 and a touch pad of the input/output unit 130 are located. The second support member 192 is formed to be long, and is provided such that the longitudinal direction (lateral width direction X) is along the line connecting the one end 150m side to the other end 150n side of the lower surface 150a. A total length L3 of the second support member 192 in the lateral width direction X is 50% or more of the total length L1 from the one end 150m to the other end 150n of the lower surface 150a. As illustrated in FIGS. 10 and 11, the second support member 192 includes a lower portion 192a in contact with the placement surface 10 of the desk, and an upper portion 192b attached to the base housing unit 150.

Figure 12:
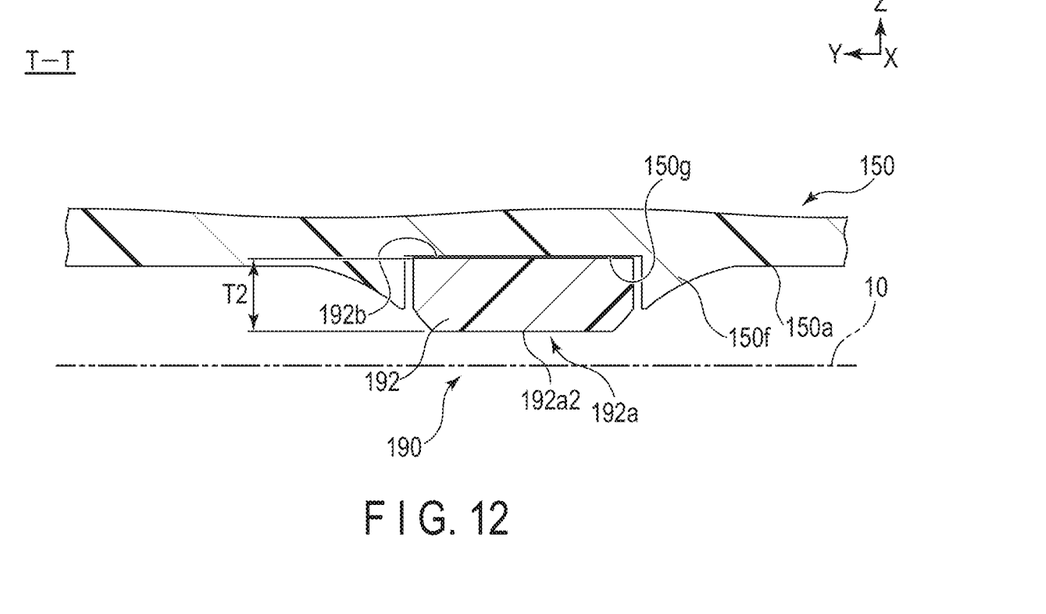
FIG. 12 is an end view illustrating FIG. 3 along the line T-T.
Figure 13:
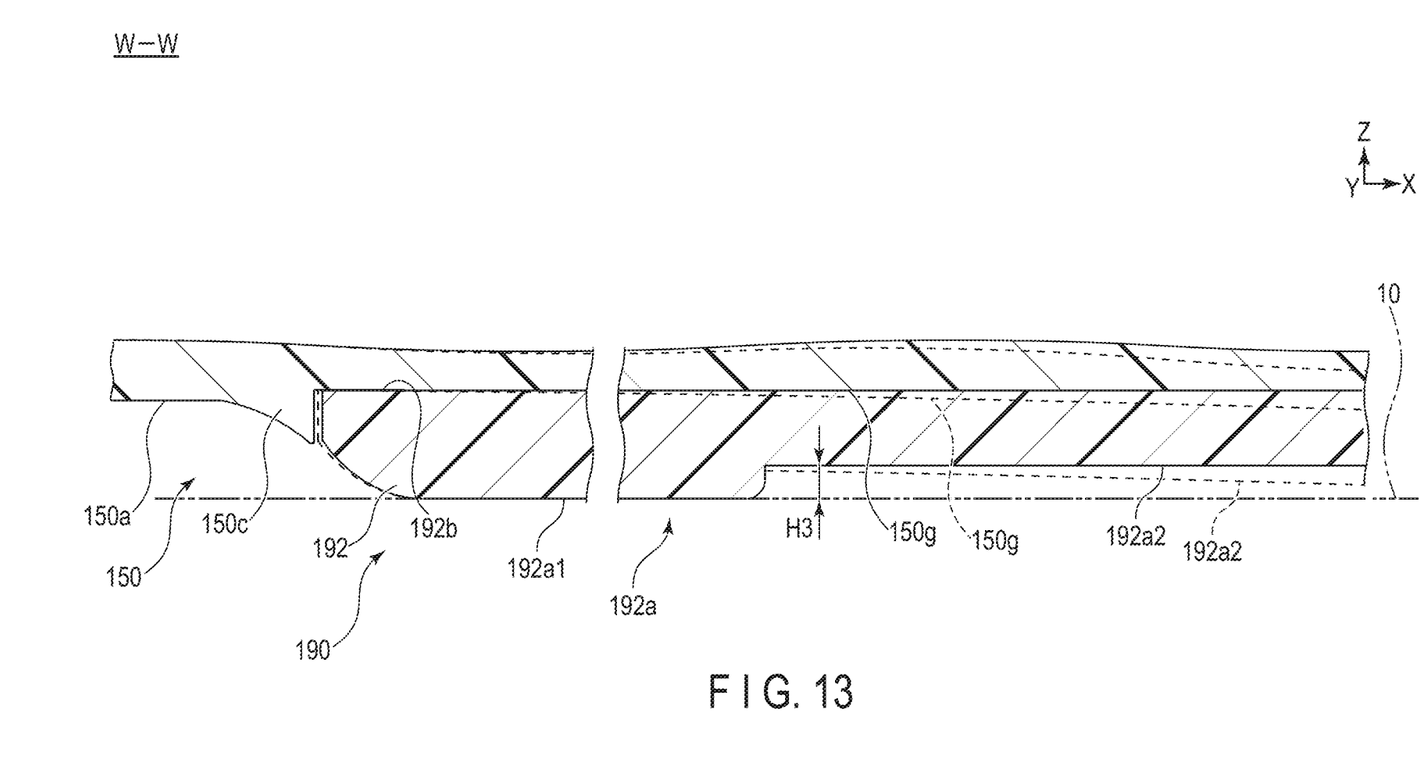
FIG. 13 is an end view illustrating FIG. 3 along the line W-W.

As shown in FIGS. 11 to 13, the second support member 192 has elasticity, and a length T2 (FIG. 12) of an intermediate portion is made shorter than a length T1 (FIG. 11) of both end portions in the height direction Z of the base housing unit 150. A gap H3 illustrated in FIG. 13 is formed between the second support member 192 and the placement surface 10 of the desk by a difference between the length T1 of both the end portions illustrated in FIG. 11 and the length T2 of the intermediate portion illustrated in FIG. 12. The second support member 192 is made of elastic rubber or resin, for example. The second support member 192 is softer and elastically deformed more easily than the base housing unit 150. That is, the second support member 192 has stability when the base housing unit 150 is placed, and has a structure that is easily deformed along the deformation of the base housing unit 150.

As illustrated in FIGS. 3, 9, 10, 11, and 13, the lower portion 192a has a first lower portion 192a1 corresponding to each of both the end portions of the base housing unit 150 indicated by the line S-S and line U-U (FIG. 3) formed in an arc shape. As illustrated in FIG. 11, the first lower portion 192a1 has a shape curved so as to bulge downward when viewed along the lateral width direction X of the base housing unit 150 (orthogonal to the depth direction Y and the height direction Z). On the other hand, as illustrated in FIGS. 3, 9, 10, 12, and 13, the lower portion 192a has a second lower portion 192a2 corresponding to the intermediate portion of the base housing unit 150 indicated by the line T-T (FIG. 3) formed in a rectangular shape. As illustrated in FIG. 12, the second lower portion 192a2 corresponds to a shape in which the lower end of the first lower portion 192a1 is cut out in the horizontal direction (the lateral width direction X and the depth direction Y) when viewed along the lateral width direction X of the base housing unit 150 (orthogonal to the depth direction Y and the height direction Z). Therefore, the second lower portion 192a2 is separated from the placement surface 10 of the desk while the first lower portion 192a1 is in contact with the placement surface 10 of the desk.

The upper portion 192b is formed in, for example, a thin planar shape. As illustrated in FIGS. 10 and 11, the upper portion 192b is formed of a plane along the lateral width direction X and the depth direction Y of the base housing unit 150.

Here, as illustrated in FIGS. 10 and 11, the upper portion 192b is attached to a lower surface 150g of a groove of a second attachment portion 150f of the base housing unit 150. The second attachment portion 150f is formed in an elongated frame shape and protrudes downward from the lower surface 150g.

An effect of the laptop computer 100 of the first embodiment will be described with reference to FIGS. 8 and 13.

According to the laptop computer 100 of the first embodiment, the support unit 190 is continuously provided from the one end 150m side to the other end 150n side of the lower surface 150a, and the rigidity of the intermediate portion located between the one end 150m side and the other end 150n side is lower than the rigidity of both the end portions on the one end 150m side and the other end 150n side. According to such a configuration, it is possible to prevent a significant decrease in the ease of deformation of the base housing unit 150 when a force is applied from the outside. For example, when a force is applied from the outside to the central portion of the base housing unit 150 toward the support unit 190 in a state where the base housing unit 150 is placed on a desk or the like, compressive stress in an application direction of the force applied to the inside of the base housing unit 150 can be absorbed by deformation of the base housing unit 150 in a bending direction without being greatly hindered by the support unit 190. That is, in the support unit 190, the stress input to the base housing unit 150 can be absorbed by deforming the intermediate portion relatively largely than both the end portions. Here, the rigidity corresponds to, for example, ease of deformation (alternatively, difficulty in deformation) when a load is input to the base housing unit 150 or the support unit 190. Therefore, between the base housing unit 150 and the support unit 190, the intermediate portion that is relatively easily deformed can be curved, for example, largely than both the end portions that are relatively hardly deformed. Therefore, it is possible to suppress the compressive stress in the application direction of the force generated inside the base housing unit 150 when the force is applied from the outside.

According to the laptop computer 100 of the first embodiment, as illustrated in FIGS. 6 to 8, the base housing unit 150 is configured such that the gap H2 (FIG. 7) at the intermediate portion is larger than the gap H1 (FIG. 6) at both the end portions between the base housing unit 150 and the first support member 191. According to such a configuration, the gap H2 between the second protrusion 150e2 and the recess 191c at the intermediate portion illustrated in FIG. 7 is made wider along the height direction Z than the gap H1 between the first protrusion 150e1 and the recess 191c in each of both the end portions illustrated in FIG. 6. That is, in the base housing unit 150, by making the intermediate portion less likely to physically interfere than both the end portions so that the intermediate portion can be configured to be relatively largely deformable, the stress input to the base housing unit 150 can be absorbed. Therefore, it is possible to suppress the compressive stress in the application direction of the force generated inside the base housing unit 150 when the force is applied from the outside.

According to the laptop computer 100 of the first embodiment, as shown in FIGS. 11 to 13, the second support member 192 has elasticity, and the length T2 (FIG. 12) of the intermediate portion is made shorter than the length T1 (FIG. 11) of both the end portions in the direction orthogonal to the lower surface 150a (the height direction Z of the base housing unit 150). According to such a configuration, in the second support member 192 illustrated in FIGS. 11 and 12, the second lower portion 192a2 can be separated from the placement surface 10 of the desk while the first lower portion 192a1 is in contact with the placement surface 10 of the desk. That is, in the support unit 190, by making the intermediate portion less likely to physically interfere than both the end portions so that the intermediate portion can be configured to be relatively largely deformable, the stress input to the base housing unit 150 can be absorbed. Therefore, it is possible to suppress the compressive stress in the application direction of the force generated inside the base housing unit 150 when the force is applied from the outside.

The laptop computer 100 of the first embodiment includes the display unit 160 that displays information and the display housing unit 170 that supports the display unit 160. The base housing unit 150 involves an opening/closing operation with the display housing unit 170 by rotation. The support unit 190 is adjacent to the display housing unit 170 across the base housing unit 150 in a state where the base housing unit 150 and the display housing unit 170 are closed. In such a state, when a force is applied from the outside to the central portion of the display housing unit 170 toward the base housing unit 150, stress tends to concentrate on the inside of the display housing unit 170 in which the structure of the member accommodated inside is weaker than that of the base housing unit 150. Therefore, according to the configuration in which the rigidity of the intermediate portion is made smaller than that of each of both the end portions between the base housing unit 150 and the end of the support unit 190 as in the present embodiment, for example, stress applied to the liquid crystal display of the display unit 160 can be suppressed. That is, damage to the liquid crystal display can be suppressed. Therefore, for example, a so-called whitening phenomenon that may occur in the liquid crystal display can be suppressed or prevented.

According to the laptop computer 100 of the first embodiment, the base housing unit 150 includes the intake ports 150b1 and the exhaust ports 150b2 on the lower surface 150a. The support unit 190 is provided between the intake ports 150b1 and the exhaust ports 150b2. According to such a configuration, the air immediately after being discharged from the exhaust ports 150b2 can be reduced from being taken in from the intake ports 150b1. That is, air entrainment can be reduced. Further, by providing the support unit 190 between the intake ports 150b1 and the exhaust ports 150b2, when the laptop computer 100 is placed on the placement surface 10 of a desk or the like, the interval between the support unit 190 and the placement surface 10 can be made narrower than the interval between the lower surface 150a of the base housing unit 150 and the placement surface 10. Therefore, the support unit 190 can suppress the air exhausted from the exhaust ports 150b2 from directly reaching the intake ports 150b1, and the air that is not sufficiently cooled after being exhausted can be made difficult to reach the intake ports 150b1. In addition, in order to further improve this function, it is preferable that the length in the thickness direction Z of the base housing unit 150 from the lower surface 150a of the base housing unit 150 to the lower portion 191a of the first support member 191 be the same between the intermediate portion and both the end portions of the support unit 190. In this way, there is almost no gap between the support unit 190 and the placement surface 10 on which the laptop computer 100 is mounted, and it is possible to almost prevent the exhaust air from the exhaust ports 150b2 from directly reaching the intake port 150b.

According to the laptop computer 100 of the first embodiment, the total length L2 of the first support member 191 and the total length L3 of the second support member 192 are 50% or more of the total length L1 of the lower surface 150a. The first support member 191 and the second support member 192 are configured to be elastically deformable more easily than the base housing unit 150. According to such a configuration, the base housing unit 150 can be stably supported by the first support member 191 and the second support member 192. More specifically, rattling of the base housing unit 150 can be prevented. When the total length L2 of the first support member 191 and the total length L3 of the second support member 192 are in a range of 60%, preferably 70%, more preferably 80% or more of the total length L1 of the lower surface 150a, the laptop computer 100 can be more stably supported.

A configuration of a laptop computer 200 of a second embodiment will be described with reference to FIG. 14.

Figure 14:
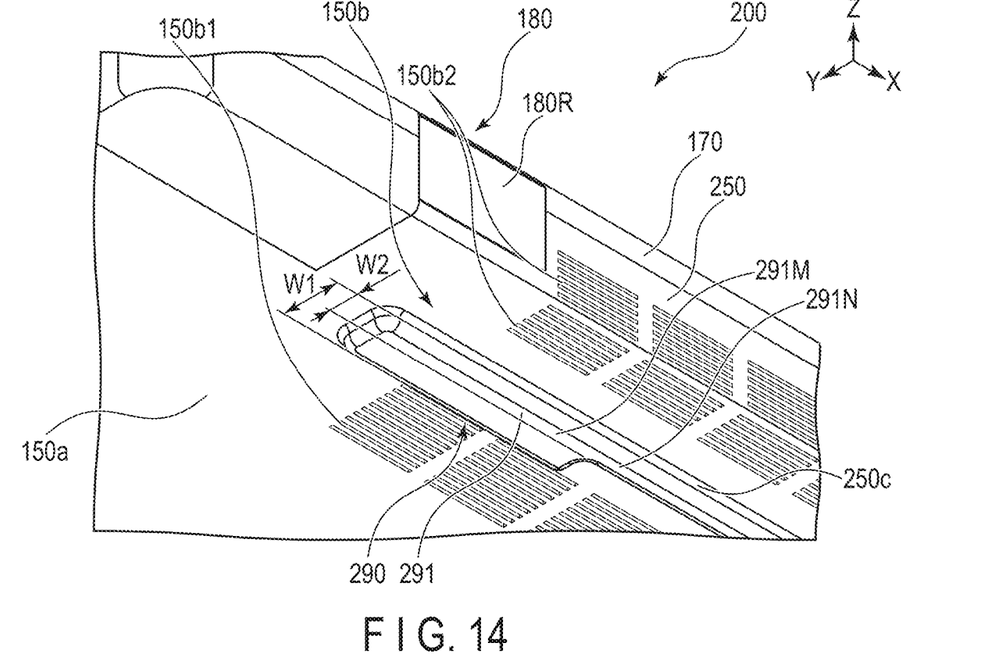
FIG. 14 is an enlarged perspective view illustrating a region that is a main part of a laptop computer 200 of a second embodiment and corresponds to the region "A" in FIG. 3.

FIG. 14 is an enlarged perspective view illustrating a region that is a main part of the laptop computer 200 of the second embodiment and corresponds to the region "A" in FIG. 3. In the second embodiment, a configuration different from that of the first embodiment will be described.

As illustrated in FIG. 14, in a first support member 291 of a support unit 290, a width of a base housing unit 250 along the depth direction Y is different between each of both end support portions 291M located at both end portions in the lateral width direction X and an intermediate support portion 291N located at an intermediate portion in the lateral width direction X. That is, a width (length W1) of each of both the end support portions 291M at both the end portions is formed to be wider (longer) than a width (length W2) of the intermediate support portion 291N at the intermediate portion. In the first support member 291, both the end support portions 291M at both the end portions and the intermediate support portion 291N at the intermediate portion are integrally formed. Further, in the base housing unit 250, the shape of a first attachment portion 250c is formed to match the shape of the first support member 291. That is, the first attachment portion 250c is formed such that a width of both end portions is wider than a width of an intermediate portion.

According to the laptop computer 200 of the second embodiment, as shown in FIG. 14, in the first support member 291, in a direction orthogonal to a line connecting one end 150m side to the other end 150n side on a lower surface 150a (depth direction Y of the base housing unit 250), the length W2 of the intermediate support portion 291N is made shorter than the length W1 of both the end support portions 291M. By changing the width (length) of the first support member 291 depending on the position, the ground contact area of the first support member 291 is caused to differ to change the flexibility depending on the position. According to such a configuration, similarly to the first embodiment described above, it is possible to suppress compressive stress in an application direction of a force generated inside the base housing unit 250 when the force is applied from the outside. That is, the stress input to the base housing unit 250 can be absorbed by deforming the intermediate support portion 291N relatively largely than both the end support portions 291M. The intermediate support portion 291N that is relatively easily deformed can be compressed as compared with both the end support portions 291M that are relatively hardly deformed. Therefore, it is possible to suppress the influence on the units accommodated in the base housing unit 250 by the force applied from the outside.

A configuration of a laptop computer 300 of a third embodiment will be described with reference to FIG. 15.

Figure 15:
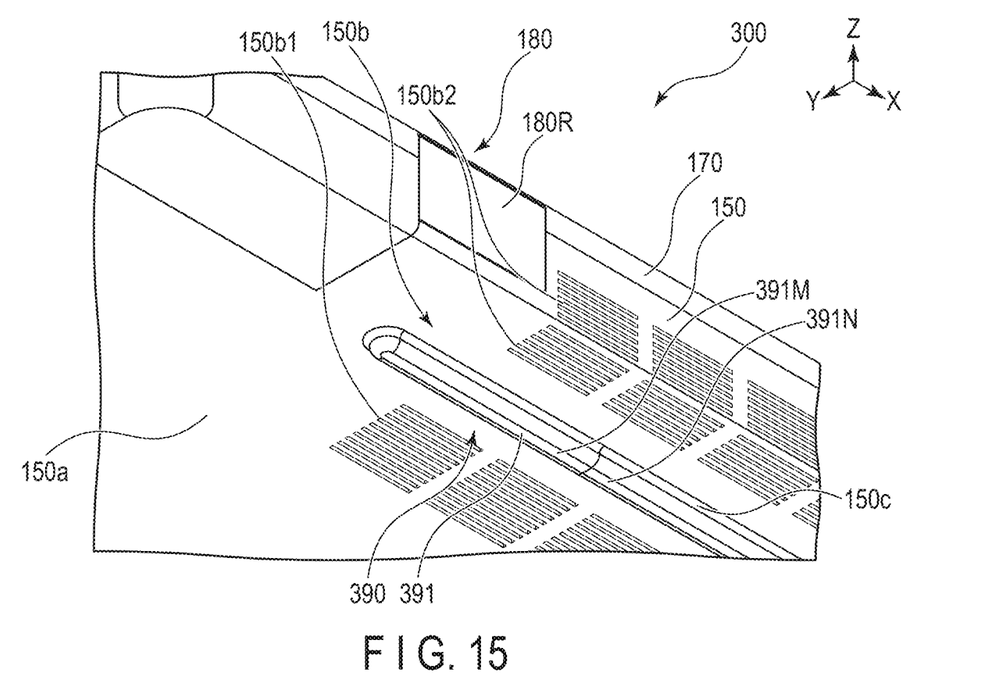
FIG. 15 is an enlarged perspective view illustrating a region that is a main part of a laptop computer 300 of a third embodiment and corresponds to the region "A" in FIG. 3.

FIG. 15 is an enlarged perspective view illustrating a region that is a main part of the laptop computer 300 of the third embodiment and corresponds to the region "A" in FIG. 3. In the third embodiment, a configuration different from that of the first embodiment will be described.

As illustrated in FIG. 15, in a first support member 391 of a support unit 390, hardness that affects expansion and contraction of a base housing unit 150 in height direction Z is different between each of both end support portions 391M located at both end portions in the lateral width direction X and an intermediate support portion 391N located at an intermediate portion in the lateral width direction X. That is, both the end support portions 391M at both the end portions are made of a material harder than the intermediate support portion 391N at the intermediate portion. In the first support member 391, both the end support portions 391M at both the end portions and the intermediate support portion 391N at the intermediate portion are integrally formed.

According to the laptop computer 300 of the third embodiment, in the first support member 391, as shown in FIG. 15, the hardness of the material of the intermediate support portion 391N is made lower than the hardness of the material of both the end support portions 391M. The hardness specifically specifies difficulty of deformation against a force such as a viscoelastic modulus of the material itself regardless of the shape, and represents the mechanical hardness of the first support member 391. By changing the hardness of the first support member 391 depending on the position, the flexibility of the first support member 391 is changed depending on the position. According to such a configuration, similarly to the first embodiment described above, it is possible to suppress compressive stress in an application direction of a force generated inside the base housing unit 150 when the force is applied from the outside. That is, the stress input to the base housing unit 150 can be absorbed by deforming the intermediate support portion 391N relatively largely than both the end support portions 391M. The intermediate support portion 391N that is relatively easily deformed can be compressed as compared with both the end support portions 391M that are relatively hardly deformed. Therefore, the compressive stress generated inside the base housing unit 150 can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the electronic device is not limited to a laptop computer, and can also be applied to, for example, a tablet terminal. In this case, a housing of the tablet terminal corresponds to the housing of the base housing unit 150.

In the support unit 190 attached to the base housing unit 150, the first support member 191 and the second support member 192 may be interchanged. Further, in the support unit 190, only the first support member 191 may be used, or only the second support member 192 may be used.

What is claimed is:

1. An electronic device comprising:
   a housing unit including a surface at least on a side on which the housing unit is placed, the housing unit including an attachment portion, the attachment portion including a groove and a protrusion which are provided on the surface; and
   a support unit that supports the housing unit, the support unit including an upper surface and a groove, the upper surface being provided on the groove of the housing unit, the groove of the support unit being formed in the upper surface, and the protrusion being able to be inserted into the groove of the support unit,
   wherein
   the support unit is provided continuously from one end side to the other end side of the surface,
   the groove formed in the support unit is provided continuously along a longitudinal direction with a constant depth,
   the protrusion of the housing unit is formed along the longitudinal direction,
   rigidity of an intermediate portion located between the one end side and the other end side is made lower than rigidity of both end portions on the one end side and the other end side,
   a protrusion length of the protrusion at the intermediate portion is shorter than a protrusion length of the protrusion at both the end portions,
   the housing unit includes an intake port and an exhaust port on the surface, and
   the support unit is provided between the intake port and the exhaust port.

2. The electronic device according to claim 1, wherein the support unit has elasticity, and a length of the intermediate portion is made shorter than a length of both the end portions in a direction orthogonal to the surface.

3. The electronic device according to claim 1, comprising:
   a display unit that displays information; and
   another housing unit that supports the display unit,
   wherein the housing unit is applied to a laptop computer that involves an opening/closing operation with the another housing unit by rotation, and
   the support unit is adjacent to the another housing unit across the housing unit in a state where the housing unit and the another housing unit are closed.

4. The electronic device according to claim 1,
   wherein the support unit is formed to be long, and is provided such that a longitudinal direction thereof is along a line connecting the one end side to the other end side,
   a total length of the support unit in the longitudinal direction is 50% or more of a total length from one end to the other end of the surface, and
   the support unit is configured to be elastically deformable more easily than the housing unit.

5. The electronic device according to claim 1, wherein a distance from a lower portion of the support unit at the intermediate portion in contact with a placement surface on which the electronic device is placed to the surface of the housing unit is distances from the lower portion of the support unit at both the end portions in contact with the placement surface on which the electronic device is placed to the surface of the housing unit.

6. An electronic device comprising:
a housing unit including a surface at least on a side on which the housing unit is placed; and
a support unit that is attached to the surface and supports the housing unit, wherein
the support unit is provided continuously from one end side to the other end side of the surface,
rigidity of an intermediate portion located between the one end side and the other end side is lower than rigidity of both end portions on the one end side and the other end side,
a length of the intermediate portion is shorter than a length of both the end portions in a direction orthogonal to a line connecting the one end side to the other end side on the surface of the support unit,
the housing unit includes an intake port and an exhaust port on the surface, and
the support unit is provided between the intake port and the exhaust port.

7. The electronic device according to claim 6, comprising:
a display unit that displays information; and
another housing unit that supports the display unit,
wherein the housing unit is applied to a laptop computer that involves an opening/closing operation with the another housing unit by rotation, and
the support unit is adjacent to the another housing unit across the housing unit in a state where the housing unit and the another housing unit are closed.

8. The electronic device according to claim 6,
wherein the support unit is formed to be long, and is provided such that a longitudinal direction thereof is along a line connecting the one end side to the other end side,
a total length of the support unit in the longitudinal direction is 50% or more of a total length from one end to the other end of the surface, and
the support unit is configured to be elastically deformable more easily than the housing unit.

9. The electronic device according to claim 6, wherein a distance from a lower portion of the support unit at the intermediate portion in contact with a placement surface on which the electronic device is placed to the surface of the housing unit is distances from the lower portion of the support unit at both the end portions in contact with the placement surface on which the electronic device is placed to the surface of the housing unit.

10. An electronic device comprising:
a housing unit including a surface at least on a side on which the housing unit is placed; and
a support unit that is attached to the surface and supports the housing unit, wherein
the support unit is provided continuously from one end side to the other end side of the surface,
rigidity of an intermediate portion located between the one end side and the other end side is lower than rigidity of both end portions on the one end side and the other end side,
hardness of a material of the intermediate portion is lower than hardness of a material of both the end portions,
the housing unit includes an intake port and an exhaust port on the surface, and
the support unit is provided between the intake port and the exhaust port.

11. The electronic device according to claim 10, comprising:
a display unit that displays information; and
another housing unit that supports the display unit,
wherein the housing unit is applied to a laptop computer that involves an opening/closing operation with the another housing unit by rotation, and
the support unit is adjacent to the another housing unit across the housing unit in a state where the housing unit and the another housing unit are closed.

12. The electronic device according to claim 10,
wherein the support unit is formed to be long, and is provided such that a longitudinal direction thereof is along a line connecting the one end side to the other end side,
a total length of the support unit in the longitudinal direction is 50% or more of a total length from one end to the other end of the surface, and
the support unit is configured to be elastically deformable more easily than the housing unit.

13. The electronic device according to claim 10, wherein a distance from a lower portion of the support unit at the intermediate portion in contact with a placement surface on which the electronic device is placed to the surface of the housing unit is distances from the lower portion of the support unit at both the end portions in contact with the placement surface on which the electronic device is placed to the surface of the housing unit.

* * * * *